(12) United States Patent
Lawson, Jr.

(10) Patent No.: US 7,299,586 B2
(45) Date of Patent: Nov. 27, 2007

(54) ANTIPEST MAT

(76) Inventor: James W. Lawson, Jr., P.O. Box 93, Afton, WY (US) 83110

( * ) Notice: Subject to any disclaimer, the term of this patent is extended or adjusted under 35 U.S.C. 154(b) by 44 days.

(21) Appl. No.: 11/206,740

(22) Filed: Aug. 19, 2005

(65) Prior Publication Data

US 2007/0039233 A1 Feb. 22, 2007

(51) Int. Cl.
*A01M 23/38* (2006.01)
(52) U.S. Cl. .......................................................... 43/98
(58) Field of Classification Search .................... 43/98; 256/10; 119/712; 361/232
See application file for complete search history.

(56) References Cited

U.S. PATENT DOCUMENTS

| 909,814 | A | | 1/1909 | Norris |
|---|---|---|---|---|
| 922,317 | A | | 5/1909 | Ames |
| 1,045,662 | A | | 11/1912 | Balint |
| 1,049,177 | A | * | 12/1912 | Vetterlein ................ 43/98 |
| 1,165,485 | A | | 12/1915 | Adams |
| 1,680,594 | A | * | 8/1928 | Connolly et al. ............. 43/98 |
| 2,098,884 | A | | 11/1937 | Rousseau |
| 2,191,127 | A | | 2/1940 | Hazel |
| 3,197,916 | A | | 8/1965 | Cole, Jr. et al. |
| 4,074,456 | A | * | 2/1978 | Tidwell ................ 43/98 |
| 4,274,123 | A | * | 6/1981 | Rogers, Jr. ................ 361/232 |
| 4,300,306 | A | | 11/1981 | Hudgin |
| 4,949,216 | A | | 8/1990 | Djukastein |
| 5,107,620 | A | | 4/1992 | Mahan |
| 5,240,759 | A | | 8/1993 | Layton |
| 5,269,091 | A | | 12/1993 | Johnson et al. |
| 5,350,619 | A | | 9/1994 | Rasmussen |
| D376,944 | S | | 12/1996 | Dunn |
| 5,607,778 | A | | 3/1997 | Padden |
| D385,142 | S | | 10/1997 | Sparks |
| D403,547 | S | | 1/1999 | Adkins |
| 5,857,646 | A | | 1/1999 | Taricco |
| 6,074,656 | A | | 6/2000 | Katsuda et al. |
| 6,215,397 | B1 | | 4/2001 | Lindskog |
| 6,314,914 | B1 | | 11/2001 | Betzen |

(Continued)

FOREIGN PATENT DOCUMENTS

GB 2 107 164 A 4/1983

OTHER PUBLICATIONS

"Pet Sage Store," http://www.petsafefences.com/petmat.html 2 pages, printed Nov. 8, 2004.

*Primary Examiner*—Kurt Rowan
(74) *Attorney, Agent, or Firm*—Richard C. Litman

(57) ABSTRACT

The antipest mat protects vehicles against entry by small animals by giving the animals a deterrent electrical shock. The mat is made up of two sections joined together to form a closed shape with an open area in the middle. The sections are connected together at a pivot point that allows the mat to be opened so that it can be placed around a vehicle support point, such as a tire, and then closed to completely surround the vehicle support point. The upper insulative surface of the mat sections holds a pattern of closely spaced conductors. The conductors are arranged so that adjacent conductors are of opposite or differing polarities. The conductors are connected to one or more connectors. A source of electric power is provided to energize the conductors so that an animal contacting two or more adjacent conductors receives an electric shock.

6 Claims, 5 Drawing Sheets

U.S. PATENT DOCUMENTS

| | | |
|---|---|---|
| 6,341,444 B1 | 1/2002 | Cina et al. |
| 6,400,268 B1 | 6/2002 | Lindskog |
| 6,474,014 B1 | 11/2002 | Yu |
| 6,519,131 B1 | 2/2003 | Beck |
| 6,948,452 B2 * | 9/2005 | Wolfgram .................. 119/712 |
| 2002/0092481 A1 * | 7/2002 | Spooner .................... 119/908 |
| 2003/0131522 A1 | 7/2003 | Swift et al. |
| 2004/0006910 A1 | 1/2004 | Lee |

\* cited by examiner

ANTIPEST MAT

BACKGROUND OF THE INVENTION

1. Field of the Invention

The present invention relates to devices for repelling animals, and more particularly to an antipest mat that delivers electrical shocks to deter rodents from entering vehicles.

2. Description of the Related Art

A frequently encountered problem is the presence unwanted animals living in habitats used by people. Rodents, such as mice and rats, are particularly difficult to control because of their prolific breeding, their ability to gnaw their way into structural materials, and because of their ability to learn to evade poisons and traps set out to deal with them.

Mice and rats are universally considered annoying pests, but these pests can be particularly destructive to aircraft. Rodents such as mice and rats often seek to enter aircraft as a place to nest. Rats are known to have caused aircraft engine problems by clogging air intakes with nesting material. Rats can cause damage to the vital systems of aircraft by gnawing on the insulation of electrical wires for communications, control, and navigation systems. Rodents also cause damage by gnawing on gaskets and weatherproofing seals which can destroy the integrity of the aircraft.

In addition to the gnawing problem, rodents compromise the mechanical and electrical systems of aircraft with their excretions. Rat droppings and urine are highly corrosives to the wiring and structural materials commonly used in aircraft.

Rats and mice, and the parasites such as fleas, ticks and mites that rodents carry are also carriers of diseases, such as hantavirus, ricksettia, leptospirosis, and typhoid. In the confined space such as an aircraft or other vehicle, the potential for spreading of rodent carried diseases to humans is particularly high. In addition to spreading diseases to the passengers and crew, rats and mice after traveling in aircraft can spread diseases to new areas.

Because rats and mice are relatively intelligent, they can quickly learn to avoid areas where they have previously experienced harm. Deterrent devices that take advantage of the intelligent nature of these rodents have proven to be effective. Systems designed to deter, rather than to exterminate or trap rodents, have the additional advantage that the deterrent systems need not be designed to attract the pests to a trap, which can result in an increased population of rodents in a given area. In some cases, devices designed to exterminate or trap rats are ineffective on a long-term basis because the remaining rats and mice respond to the decreased population by breeding more prolifically.

Thus, an antipest mat solving the aforementioned problems is desired.

SUMMARY OF THE INVENTION

The antipest mat protects vehicles against entry by small animals by giving the animals a deterring electrical shock. The mat is made up of two sections that are joined together to form a closed shape with an open area in the middle. The sections are connected together at a pivot point that allows the mat to be opened so that it can be placed around a vehicle support point, such as a tire, and then closed to completely surround the vehicle support point. The upper, insulating surface of the mat sections holds a pattern of closely spaced conductors. The conductors are arranged so that adjacent conductors are of opposite or differing polarities. The conductors are connected to one or more connectors. A source of electric power is connected to one or more of the connectors, energizing the electrical circuit so that an animal contacting two or more adjacent conductors receives an electric shock.

The mat is provided with a drainage system to prevent water from rain or condensation from collecting on the upper surface of the mat and shorting the mat conductors. The drainage system includes a plurality of drain holes forming a pattern covering the area of the mat containing the conductors. The drain holes communicate with the upper and lower surfaces of the mat to allow water condensing or falling on the surface of the mat to drain to the supporting surface.

The underside of the antipest mat is provided with channels which route the drained water out from under the mat so that the drained water does not accumulate under the mat thus causing the drainage of water from the upper surface to cease.

The antipest mat is supplied by a power source that delivers an electrical potential sufficient to give a deterring shock to an animal contacting the mat. The power supply may comprised of a dc power source, a dc to ac inverter for converting the dc power to an alternating or pulsating waveform, and a voltage multiplier circuit for converting the low voltage waveform to the required potential.

The present invention extends to a method for discouraging animals from entering a vehicle. The method includes the steps of providing one or more antipest mats; installing the antipest mats around each of the support points for the vehicle (such as the tires of a car or the landing gear of an air craft) on a horizontal surface that the animals must cross to gain access to the vehicle; and connecting a source of electrical potential sufficient to cause an electric shock to an animal contacting the conductors of the antipest mat.

Preferably the voltage of the power source is selected to provide a non-lethal electrical shock to an animal stepping on the antipest mat, but alternatively the voltage and current delivered by the power source may be sufficient to electrocute the animal.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an antipest mat that uses electric shock to deter animal pests, such as rodents, from entering a protected area. An embodiment of an antipest mat according to the present invention is shown in FIGS. 1-3.

Figure 1:
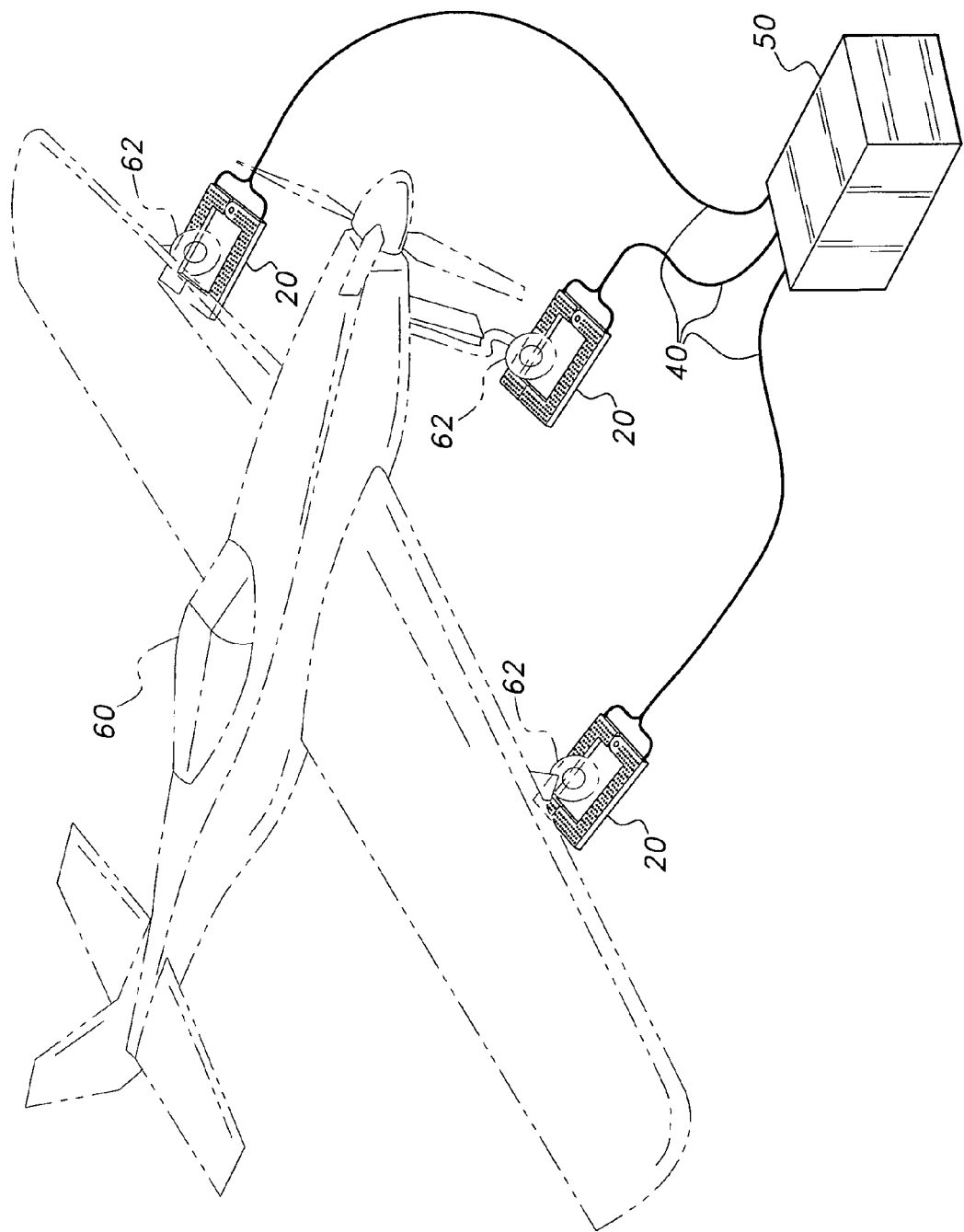
FIG. 1 is an environmental, perspective view of an antipest mat according to the present invention protecting an aircraft.

Referring first to FIG. 1, use of the antipest mat may be appreciated. Antipest mats 20 are installed around the landing gear of the aircraft 60. The antipest mats 20 are disposed around tires 62 of the landing gear so that the airplane is supported directly on the ground, rather than resting on the surface of the mat 20.

The antipest mats 20 are connected to a power supply 50 by interconnecting cables 40. The power supply 50 generates the electrical voltage required to deliver a shock to a rodent coming into contact with the antipest mats 20.

As is evident from FIG. 1, a rat or mouse seeking to enter the aircraft 60 must do so by climbing up on the wheels 62 of the aircraft 60, as the wheels 62 are the only point of contact between the aircraft 60 and the ground. In order to gain access to the wheels 62, an animal must negotiate one of the antipest mats 20.

Figure 2A:
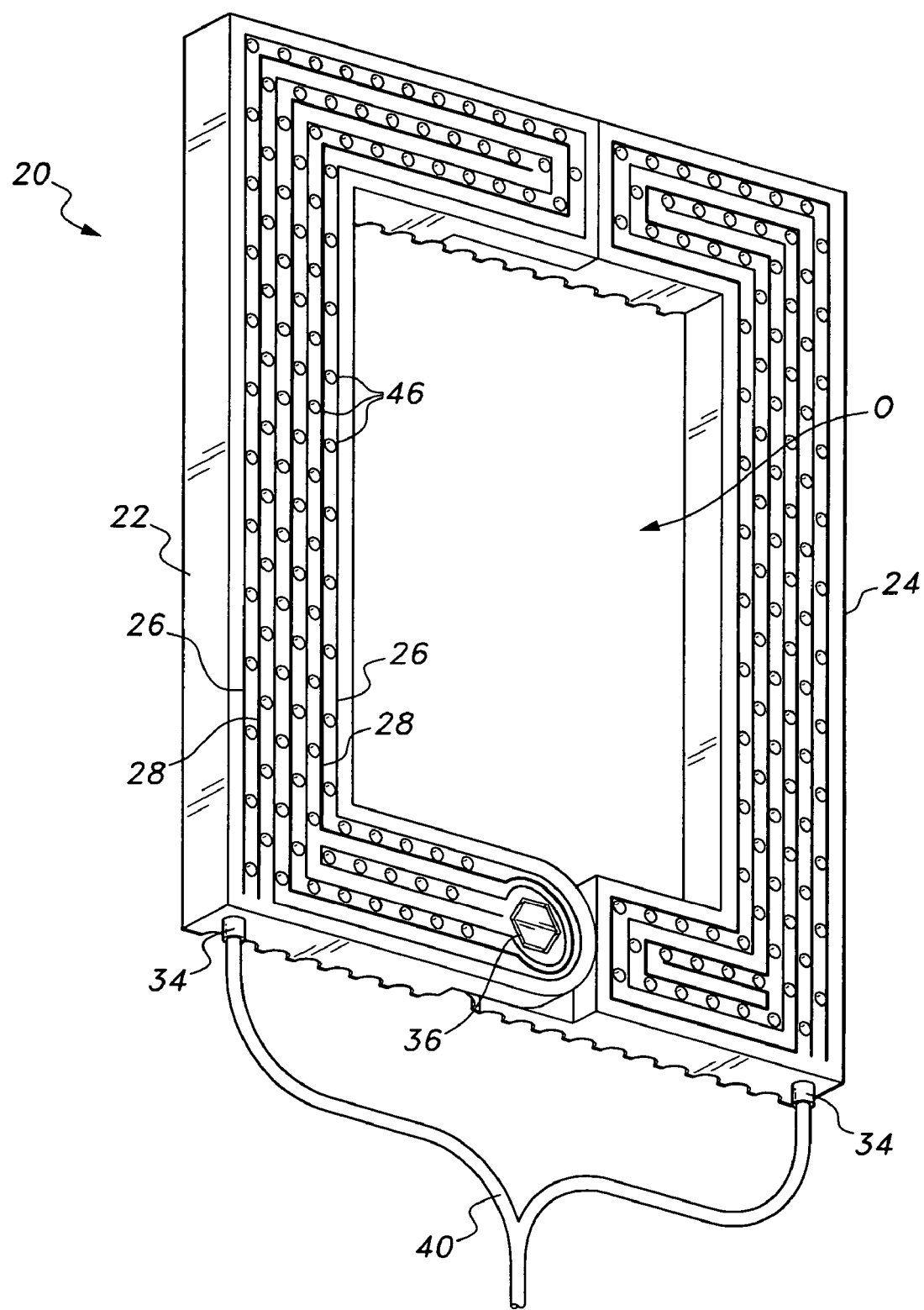
FIG. 2A is a front perspective view of the antipest mat according to the present invention.
Figure 2B:
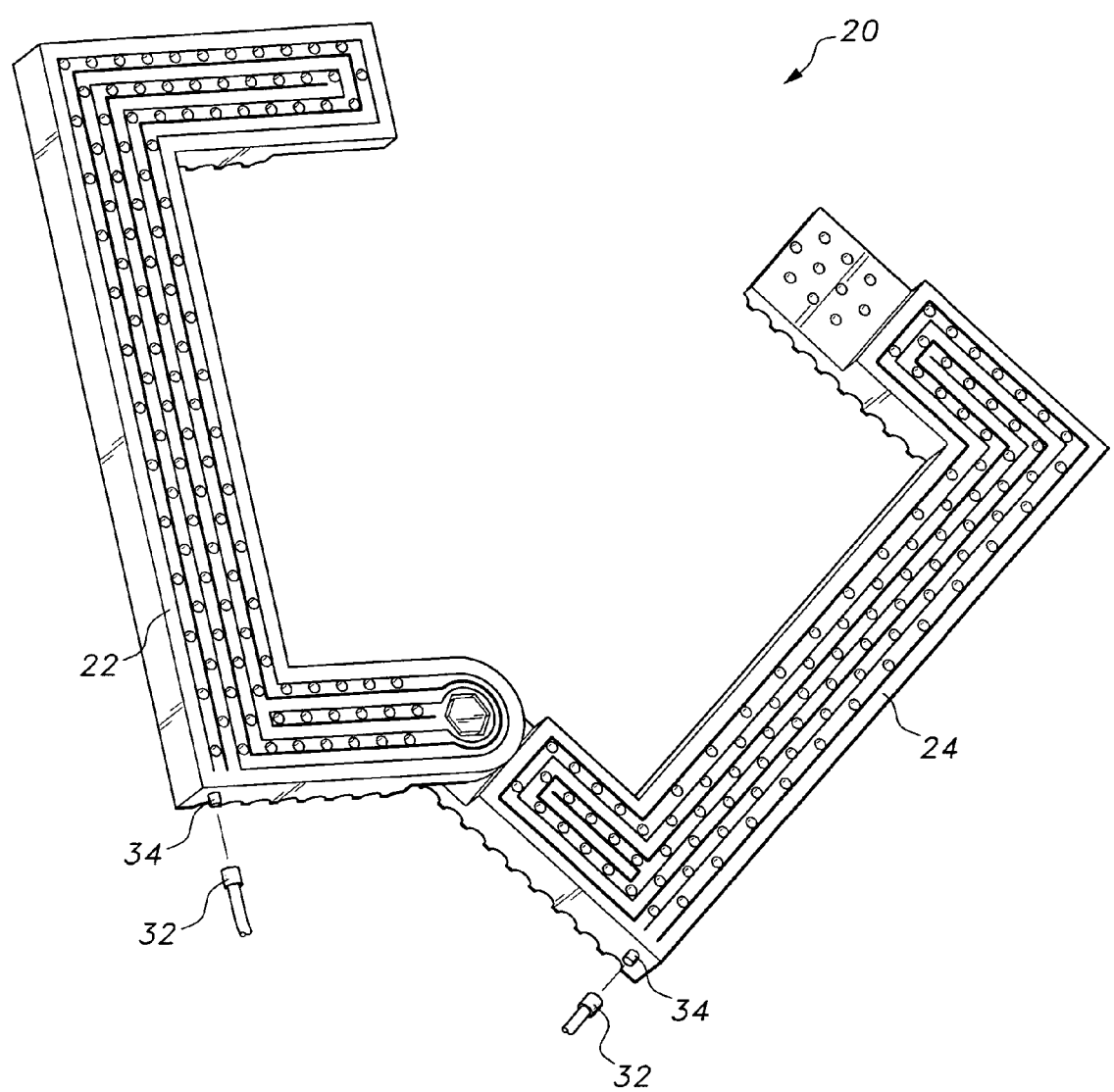
FIG. 2B is a front perspective view of the antipest mat of FIG. 2A opened for placing around a tire.
Figure 3:
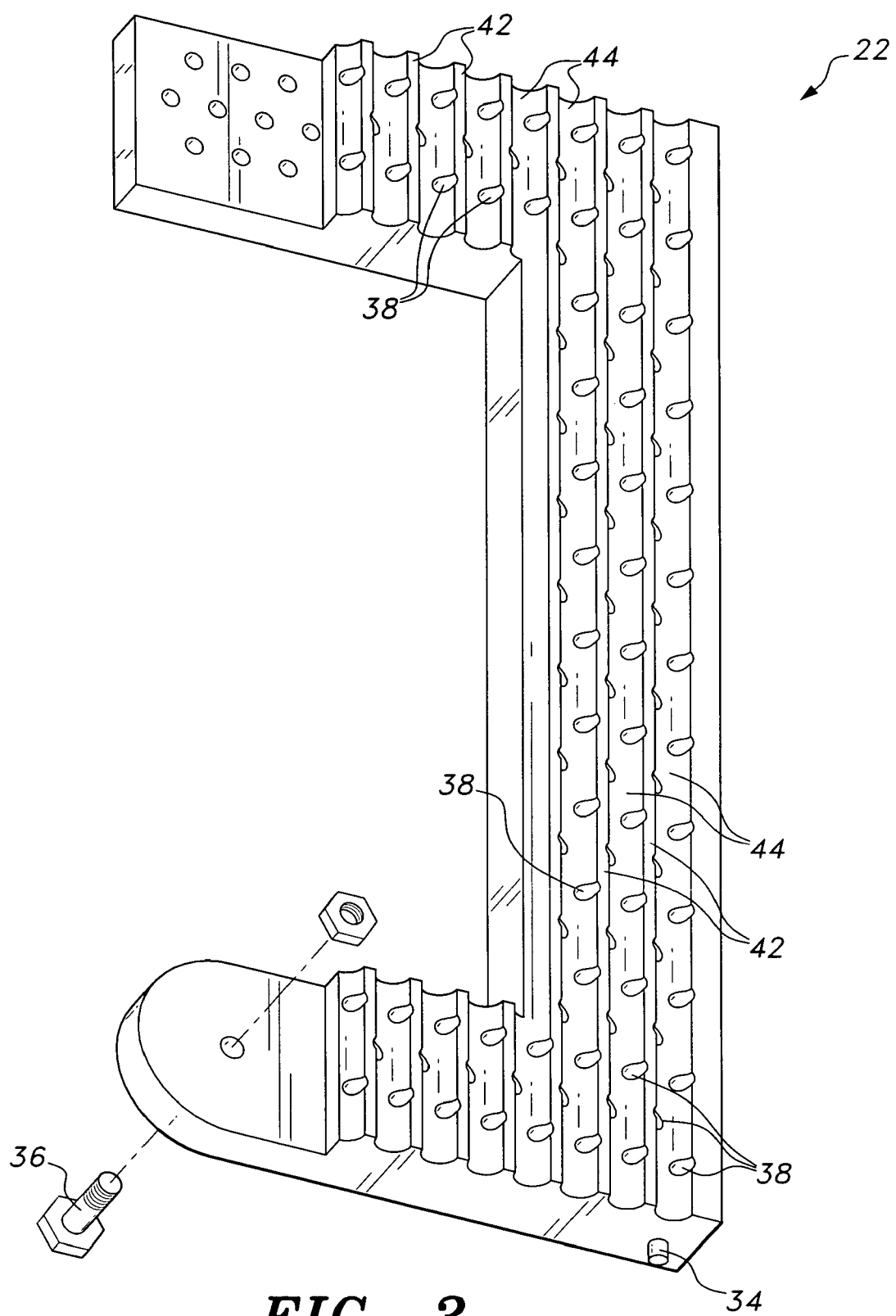
FIG. 3 is a perspective view of a section of an antipest mat as seen from a bottom perspective.

Referring to FIGS. 2A, 2B, and 3, it is shown that the antipest mat 20 comprises two sections, including a left section 22 and a right section 24 and having an opening O therebetween. The sections 22 and 24 are assembled to form a rectangle or other closed shape with an open region in the center of the assembled mat 20. The mat sections 22 and 24 are made of a non-conductive or insulating material, such as a polymeric or elastomeric material. For example, the mat sections may be made of rubber. The mat sections 22 and 24 are joined on one side by a bolt or pin 36. The pin 36 acts as a pivot to allow the mat sections to be opened, as shown in FIG. 2B, to place the antipest mat 20 around the tire of a vehicle or other object. After the antipest mat 20 is placed in position, the The upper surface of each mat section 22 and 24 is provided with a pattern of electrical conductors. The conductor pattern consists of an arrangement of conductors of a first polarity 26 and conductors of the opposite polarity 28. The conductors 26 and 28 are arranged in an alternating pattern and are spaced closely together so that an animal contacting the surface of the mat 20 is likely to contact conductors of opposite polarity simultaneously. Contacting conductors of opposite polarity simultaneously completes an electrical circuit to deliver an electric shock to the animal. In the embodiment shown in FIGS. 2A and 2B, the conductors are in the form of thin parallel line segments. The conductors may be laminated directly to the upper surface of the mat 20, or may be etched on a surface, such as a printed circuit board, which is secured to the upper surface of the mat 20 by any appropriate fastener, such as adhesive, staples, or screws.

The conductor pattern covers substantially the entire surface of the mat 20 so that a small animal stepping on any part of the mat 20 is highly likely to make contact with two or more conductors.

For each mat section 22 and 24, power is supplied to the conductors of the mat section by an electrical cable 40 connected to a mat connector 34 for the respective section. As shown in FIG. 2B, the electrical cable 40 is terminated in a pair of connectors 32 that mate with mat connectors 34. Preferably the mat connector 34 is of a male configuration that plugs into a connector 32 of a mating female configuration terminating the cable 40. Using a female configuration for the cable connectors 32 minimizes the possibility of delivering an electrical shock to a person handling the cable connector 32 while it is disconnected from the antipest mat 20.

If water from rain or condensation is allowed to accumulate on an antipest mat, the water may form a conductive path between the closely spaced conductors. When the mat conductors of opposite polarity are thus shorted, an animal making contact with the conductors 26 and 28 will be not receive the intended electric shock and will be able to cross the antipest mat 20 and enter the aircraft or other vehicle being guarded by the mat 20. FIGS. 2A and 3 show the details of the drainage system of the antipest mat 20 intended to prevent this short-circuiting problem.

The surface of the antipest mat 20 is provided with a pattern of drainage holes 46 covering the upper surface of each of the sections 22 and 24 of the antipest mat 20. These drainage holes 46 penetrate the entire cross section of the mat sections 22 and 24, allowing water falling or condensing onto the surface of the mat 20 to drain to the supporting surface on which the antipest mat 20 rests.

As shown in FIG. 3, the reverse surface of each section 22 and 24 of the antipest mat 22 is provided with a series of grooves comprising a plurality of raised portions or ribs 42 and troughs 44. The ribs 42 rest on a supporting surface, such as a ground or floor, while the troughs 44 create drainage channels under the mat section 22. Water flowing through the drainage holes 46 flows though these drainage channels so that water can flow away the mat section 22.

Referring again to FIG. 1, electrical current at a high voltage is supplied to the antipest mats 20 from the high voltage power supply 50 via the cables 40. The electrical current provided by the power supply 50 may be direct or alternating current.

Figure 4:
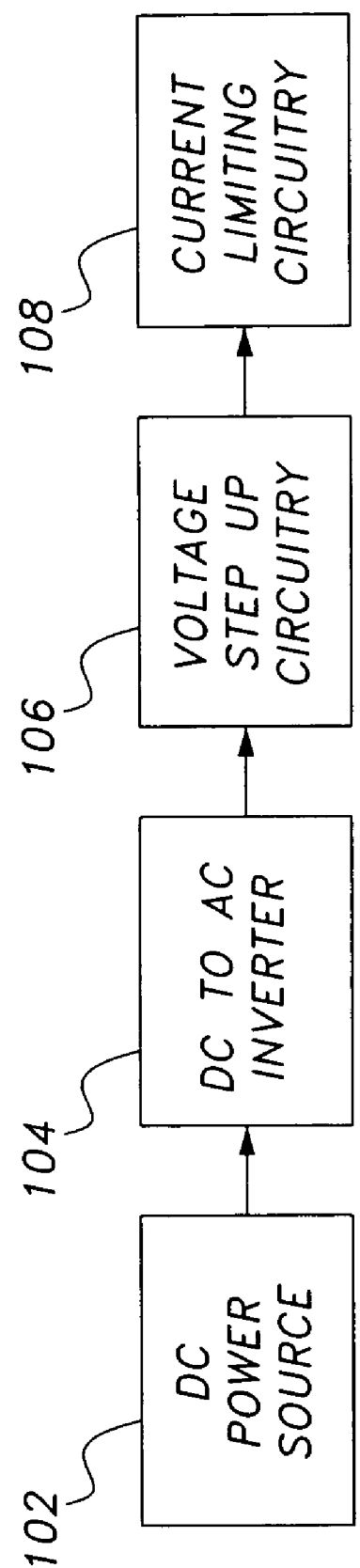
FIG. 4 is a block diagram of power supply for the antipest mat according to the present invention.

FIG. 4 is a block diagram showing the electrical circuitry in one embodiment of the invention. The source of energy is a dc power source 102. Various sources of dc power may be used with the invention. The dc power may be provided from a rectified ac power source, such as that supplied by a conventional 120-volt wall receptacle. Alternatively, a dc source, such as a dc battery or an array of solar cells, may be employed as the dc power source 102.

Electrical power from the DC power source 102 is supplied to a DC to AC inverter circuit 104. The inverter circuit converts the direct current supplied by the DC power source 102 into a pulsating or alternating waveform required by the voltage step up or multiplier circuitry 106. As one versed in the electronic arts may appreciate, the inverter circuit may consist of a solid-state oscillator circuit that generates an oscillating waveform of a frequency determined by passive components, such as resistors and capacitors, or inductors. Alternatively a pulsating waveform can be generated using an electromagnetic circuit similar to that of an electric bell, in which a magnetically operated bell clapper is used as a switch to alternately make and break a dc circuit.

The oscillating or pulsating wave is then supplied to the voltage step up circuitry 106. This circuitry increases the voltage of the oscillating or pulsating waveform to the voltage level required to operate the antipest mats. The shock voltage generated by the antipest mat power supply 50 is selected based on the degree of deterrence to provide to a particular pest, and the particular pest's ability to resist or withstand the electric shock. Higher voltages and currents may be employed to electrocute pests, while reducing the voltage and/or the current provides a painful but non-lethal shock. Preferably a non-lethal shock is employed against rats and mice so that the rodent population contains trained rats that have learned to avoid contact with the mats. When lethal voltages are used, the remaining rats or mice will repopulate the rodent community with rodents who have not been trained by electric shocks. The use of non-lethal voltages also results in lowered risks to personnel who may come into contact with the conductors of the antipest mat.

Non-lethal voltage settings may range from approximately one hundred volts up to several thousand volts, provided that the shock current is limited to non-lethal levels.

The voltage step up circuitry may be comprised of a transformer of either the isolation or the autotransformer type. The voltage delivered by the output of the transformer is determined by the ratio of the number of turns between the secondary winding, which is the output winding of the transformer and the primary winding to which the low voltage oscillating or pulsating wave form is applied. For example, a transformer with a 1000-turn secondary winding and a 10-turn primary winding can generate a 900-volt output from a 9-volt pulsating waveform. Alternatively, the voltage step up circuitry may comprise any voltage multiplier circuit known in the art for applying stuns or shocks to humans or animals.

The power supply 50 may further include current limiting circuitry 108. The current limiting circuitry is intended to provide a degree of assurance that the shock voltage delivered by the power supply and made available to the conductors of the antipest mats 20 does not result in a lethal shock to humans. The power supply circuitry may work by limiting the current or duration of the shock delivered by the antipest mat 20. In one embodiment, the current limiting component may consist of a passive component, such as a resistor or capacitor sized so that the impedance of the component, as calculated by Ohm's law, results in a non-fatal level of current. For example, if the power supply generates a maximum output voltage of 7,000 volts, a resistor of 700 kilohms will limit the maximum output current to 10 ma. Alternatively, the secondary or primary winding of the transformer used in the voltage step up circuitry can incorporate the required resistance, eliminating the need to provide a dedicated current limiting component.

In an alternate embodiment, a timing circuit triggered by an output current from the power supply can be used to shutoff the output after a short interval to prevent a high current shock from being fatal.

The power supply alternatively can be powered by an AC source rather than a DC power source, in which case the DC to AC inverter circuitry can be omitted.

The antipest mats 20 may have any shape, such as an oval shape where the center of the oval is open, provided the sections of the mat can be opened to allow the mat to be placed around the tire or other support for a vehicle or aircraft.

In an alternate embodiment, the conductors can consist of a pattern of small closely disks or other discrete shapes arranged so that adjacent disks are of opposite polarity so that a small animal stepping on the mat is likely to contact adjacent conductors simultaneously.

In another alternate embodiment, drainage of water from the mat may comprise constructing the mat with a sloping upper surface so that the water will drain from the antipest mat 20, rather than collecting on the surface. The sloped surface can be combined with the drain holes and drainage channels described above.

In another embodiment, power is provided to antipest mat through a cable to a single connector on one of the mat sections. Power is routed to the other section from the first section to supply the conductors of the second section.

It is to be understood that the present invention is not limited to the embodiments described above, but encompasses any and all embodiments within the scope of the following claims.

I claim:

1. An antipest mat, comprising:
    a first mat section and a second mat section pivotally attached to the first section about a vertical axis to form an assembled mat, whereby pivoting the first section relative to the second section opens the assembled mat, each of the mat sections having an upper and lower surface, said vertical axis being perpendicular to the upper and lower surfaces of the mat sections, the assembled mat having a closed shape defining a central opening, the upper surface of the assembled mat made of an electrically insulating material;
    a pattern of electrical conductors disposed on the upper surface of the mat, the conductor pattern including a plurality of closely spaced conductors covering substantially all of the upper surface of the first and second mat section sections, the conductors being arranged in an electrical circuit with adjacent conductors of the conductor pattern having opposite voltage polarities;
    one or more electrical connectors electrically connected to the pattern of electrical conductors and adapted for connection to a voltage source, the electrical connectors being mounted to at least one of the mat sections, whereby when voltage is applied to the pattern of conductors, an electric shock is administered to an animal pest crossing the mat sections.

2. The antipest mat according to claim 1, wherein the mat sections have a plurality of drainage holes defined therethrough, the drainage holes communicating between the upper and lower surfaces of the assembled mat.

3. The antipest mat according to claim 2, further comprising a plurality of ribs extending from the lower surface of the mat sections defining a plurality of drainage channels communicating with the drainage holes.

4. The antipest mat according to claim 1, further comprising an electrical power source for providing the voltage source, the electrical power source having an electrical circuit for converting a dc input voltage to an ac voltage for providing an electric potential to an animal coming into contact with adjacent conductors of the assembled mat.

5. A method of discouraging animal pests from entering a vehicle using the antipest mat of claim 1, comprising the steps of:
    positioning the antipest mat in a path used by an animal to enter the vehicle and pivoting the first mat section towards the second mat section to close the opening of the antipest mat around a support means for the vehicle; and
    connecting a source of electrical power to the one or more electrical connectors.

6. The method of discouraging animal pests according to claim 5, wherein the voltage source provides a non-lethal electrical potential to the animal.

* * * * *